(12) United States Patent
Shinozaki et al.

(10) Patent No.: US 10,775,079 B2
(45) Date of Patent: Sep. 15, 2020

(54) SOLAR HEAT COLLECTION SYSTEM AND OPERATION METHOD THEREOF

(71) Applicant: MITSUBISHI HITACHI POWER SYSTEMS, LTD., Yokohama-shi, Kanagawa (JP)

(72) Inventors: Kohei Shinozaki, Yokohama (JP); Takahiro Marumoto, Yokohama (JP); Kazuhito Koyama, Yokohama (JP)

(73) Assignee: MITSUBISHI HITACHI POWER SYSTEMS, LTD., Yokohama-shi, Kanagawa (JP)

(*) Notice: Subject to any disclaimer, the term of this patent is extended or adjusted under 35 U.S.C. 154(b) by 113 days.

(21) Appl. No.: 15/770,555

(22) PCT Filed: Nov. 4, 2016

(86) PCT No.: PCT/JP2016/082791
§ 371 (c)(1),
(2) Date: Apr. 24, 2018

(87) PCT Pub. No.: WO2017/078134
PCT Pub. Date: May 11, 2017

(65) Prior Publication Data
US 2019/0056148 A1 Feb. 21, 2019

(30) Foreign Application Priority Data
Nov. 4, 2015 (JP) ................. 2015-216892

(51) Int. Cl.
*F24S 23/77* (2018.01)
*F22G 1/06* (2006.01)
(Continued)

(52) U.S. Cl.
CPC .............. *F24S 23/77* (2018.05); *F22B 1/006* (2013.01); *F22G 1/06* (2013.01); *F24S 20/20* (2018.05);
(Continued)

(58) Field of Classification Search
CPC ....................................................... F24S 23/74
(Continued)

(56) References Cited

U.S. PATENT DOCUMENTS 8,627,664 B2    1/2014  Katz et al.
2005/0126170 A1  6/2005  Litwin
(Continued)

FOREIGN PATENT DOCUMENTS

DE    10248064 A1    4/2004
DE    10248068 A1    5/2004
(Continued)

OTHER PUBLICATIONS

Search Report dated Sep. 21, 2018, issued in counterpart Spanish application No. P201890026, with English translation. (9 pages).
(Continued)

*Primary Examiner* — Vivek K Shirsat
(74) *Attorney, Agent, or Firm* — Westerman, Hattori, Daniels & Adrian, LLP

(57) ABSTRACT

The time for steam generated in a low temperature heating device to reach a saturated steam temperature is reduced a low temperature heating device configured to heat supplied water by using heat of sunlight to generate steam; a steam separation device configured to separate two-phase water-steam fluid generated in the low temperature heating device into water and steam; and a high temperature heating device configured to heat the steam separated in the steam separation device by using heat of sunlight reflected by a plurality of heliostats to generate superheated steam.

5 Claims, 9 Drawing Sheets

(51) Int. Cl.
*F24S 20/20* (2018.01)
*F24S 20/25* (2018.01)
*F22B 1/00* (2006.01)
*F24S 50/20* (2018.01)

(52) U.S. Cl.
CPC ............... *F24S 20/25* (2018.05); *F24S 50/20* (2018.05); *Y02E 10/41* (2013.01); *Y02E 10/44* (2013.01); *Y02E 10/46* (2013.01)

(58) Field of Classification Search
USPC ....... 126/573, 600, 602, 692, 652, 655, 657; 52/200; 60/641.5, 641.8
See application file for complete search history.

(56) References Cited

U.S. PATENT DOCUMENTS

| | | | |
|---|---|---|---|
| 2007/0283949 A1* | 12/2007 | Levin | F24S 40/80 126/573 |
| 2009/0217921 A1 | 9/2009 | Gilon et al. | |
| 2009/0261591 A1 | 10/2009 | Palkes et al. | |
| 2011/0088396 A1 | 4/2011 | Katz et al. | |
| 2014/0138952 A1 | 5/2014 | Marumoto et al. | |
| 2015/0240792 A1* | 8/2015 | Ehrsam | F03G 6/067 60/641.8 |
| 2015/0337811 A1* | 11/2015 | Chen | F22B 1/006 60/641.5 |

FOREIGN PATENT DOCUMENTS

| | | |
|---|---|---|
| JP | 2014-092086 A | 5/2014 |
| WO | 2009/129167 A2 | 10/2009 |
| WO | 2013/002054 A1 | 1/2013 |
| WO | 2014/114624 A1 | 7/2014 |
| WO | 2014/148259 A1 | 9/2014 |

OTHER PUBLICATIONS

International Search Report dated Dec. 27, 2016, issued in counterpart application No. PCT/JP2016/082791. (2 pages).

* cited by examiner

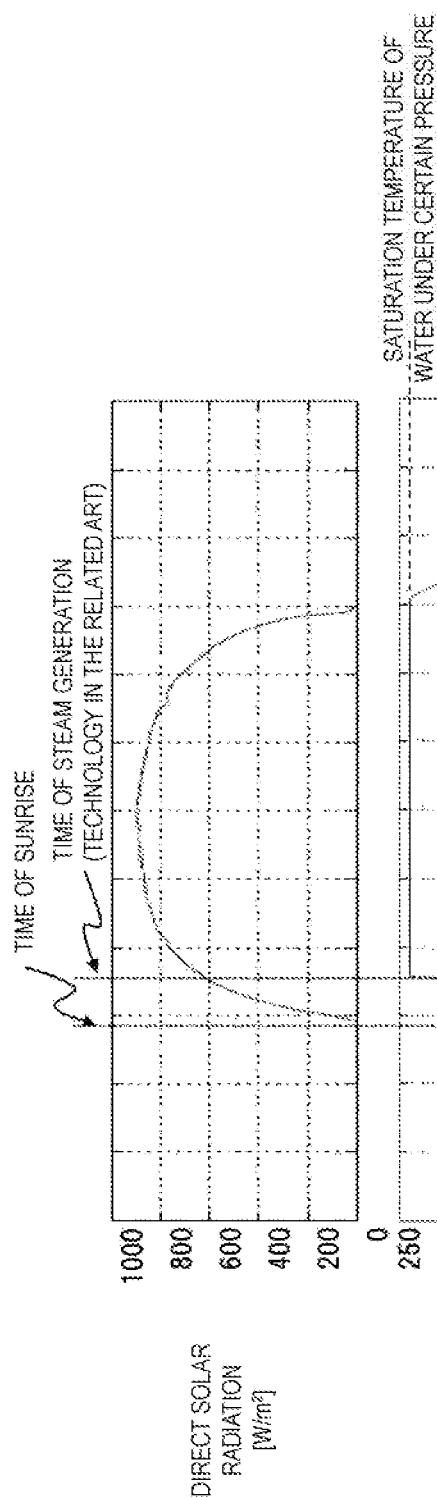
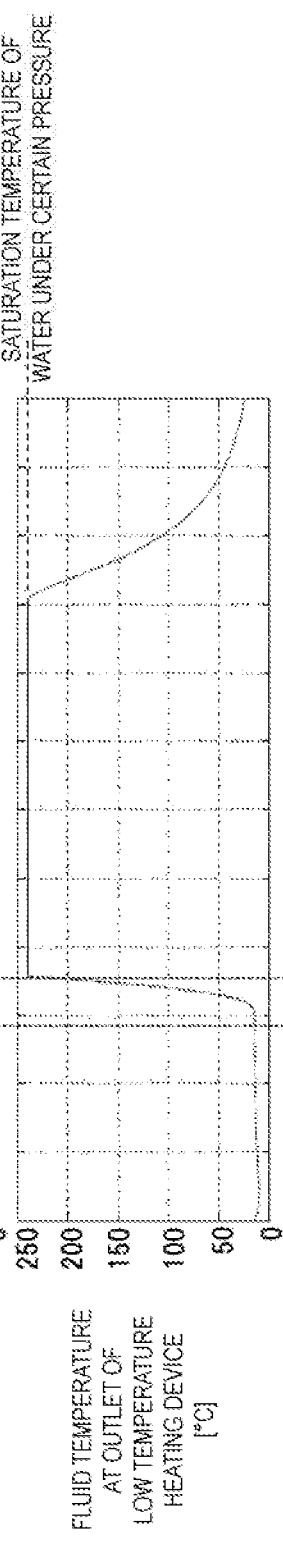
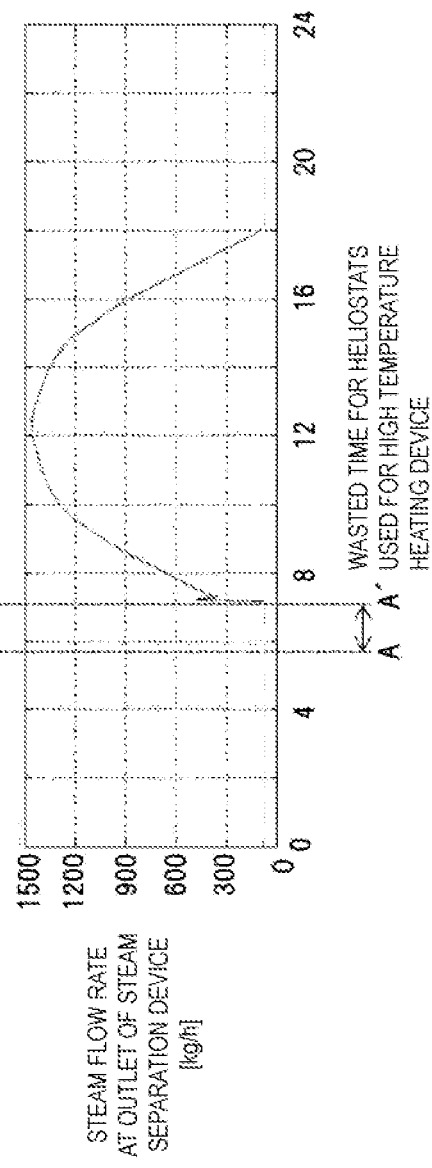
FIG. 6A
FIG. 6B
FIG. 6C

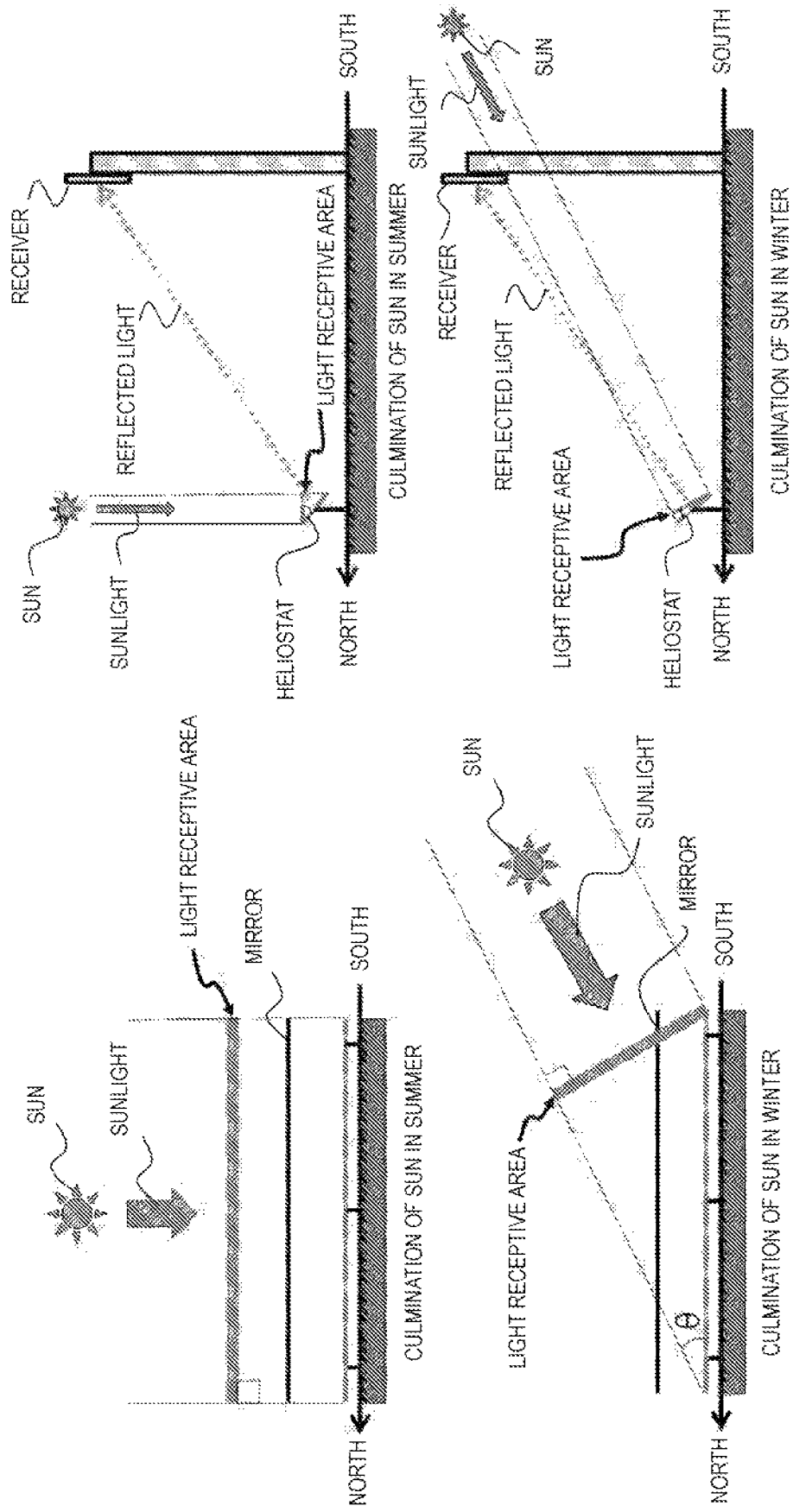
FIG. 7A PRINCIPLE OF HEAT COLLECTION BY LOW TEMPERATURE HEATING DEVICE
FIG. 7B PRINCIPLE OF HEAT COLLECTION BY HIGH TEMPERATURE HEATING DEVICE

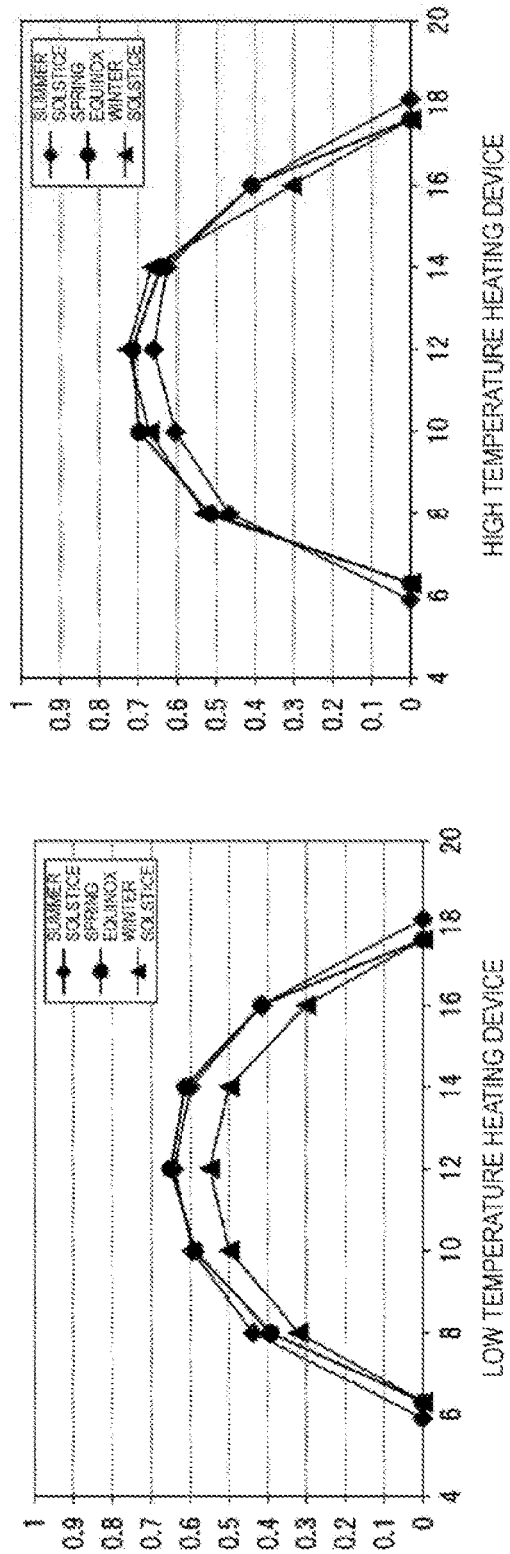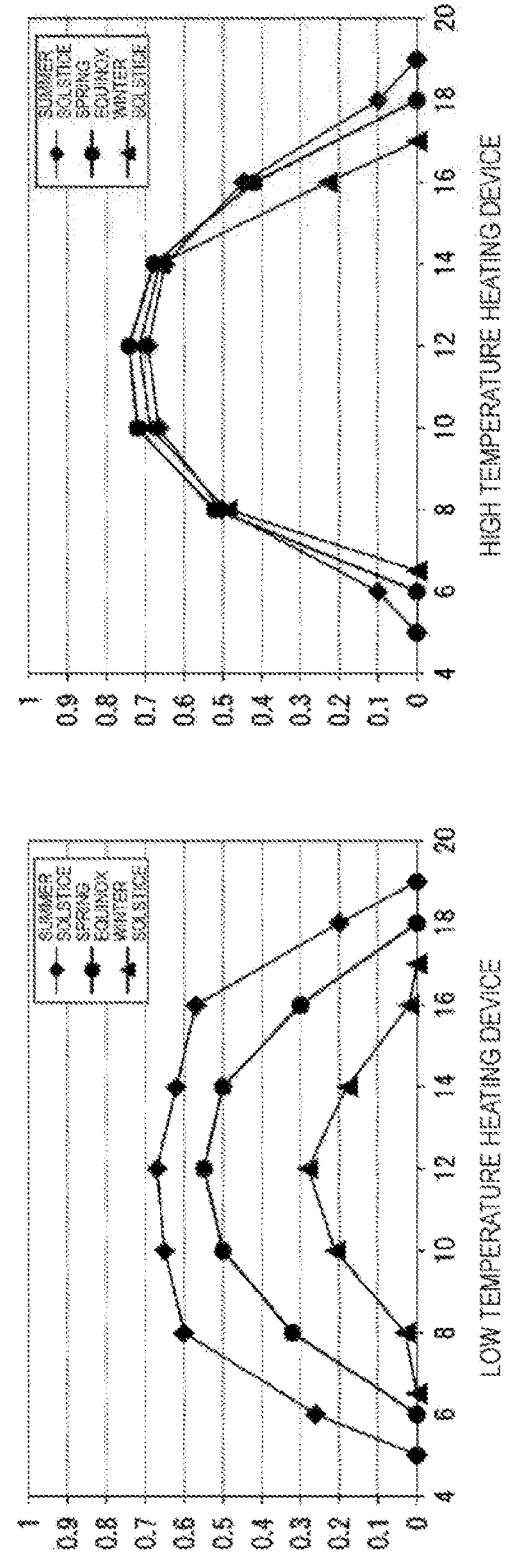
FIG. 8A  HEAT COLLECTING EFFICIENCY AT LOW LATITUDE
FIG. 8B  HEAT COLLECTING EFFICIENCY AT HIGH LATITUDE

SOLAR HEAT COLLECTION SYSTEM AND OPERATION METHOD THEREOF

TECHNICAL FIELD

The present invention relates to solar heat collection systems collecting solar heat to generate steam from water and operation methods thereof.

BACKGROUND ART

For example, a solar heat collection system used for solar thermal power plants described in Patent Document 1 is known in the art. Patent Document 1 describes a configuration of "a solar heat boiler including a low temperature heating device that heats water supplied from a water supply pump by solar heat; a steam separation device that separates two-phase water-steam fluid generated in the low temperature heating device into water and steam; a high temperature heating device that heats the steam separated in the steam separation device by solar heat; and a circulating pump that supplies the water separated in the steam separation device to the low temperature heating device" (see Abstract).

In the configuration of Patent Document 1, a low-temperature heating device of linear light focusing type such as trough type or Fresnel type is used, and a heat collecting device of tower type is used as a high temperature heating device. According to Patent Document 1, the light focusing and heat collecting device can be reduced in size. Thus, the construction cost can be reduced by reducing the height of the tower. Additionally, the light focusing accuracy required for heliostats is in proportion to the height (distance) of the tower, and thus costs required to maintain the light focusing accuracy high, such as costs of adjusting angles during construction and operation, can be reduced.

PRIOR ART DOCUMENTS

Patent Document

Patent Document 1: WO 2013/002054

SUMMARY OF THE INVENTION

Problem to be Solved by the Invention

However, according to the known technology described in Patent Document 1, steam cannot be heated by the high temperature heating device until saturated steam sufficient to generate superheated steam is obtained (until steam is separated by the steam separation device). In other words, although the heliostats are ready to focus sunlight, there is no steam serving as a working medium in the high temperature heating device, and thus heat collection (heat recovery) is not achieved. This will be described below, using FIGS. 6A to 6C.

FIGS. 6A to 6C respectively illustrate direct solar radiation under fine weather (FIG. 6A), a fluid temperature at an outlet of the low-temperature heating device (FIG. 6B), and a steam flow rate at an outlet of the steam separation device (FIG. 6C). As illustrated in FIG. 6A, the direct solar radiation increases as the sun rises, and water supplied to a heat transfer tube of the low-temperature heating device is heated. This leads to an increase in the fluid temperature at the outlet of the low-temperature heating device as illustrated in FIG. 6B. As illustrated in FIG. 6C, steam is not supplied from the steam separation device to the high temperature heating device until the fluid temperature at the outlet of the low temperature heating device reaches the saturation temperature and thus two-phase water-steam fluid is formed. A large number of heliostats, excluding the heliostats preheating toward the high temperature heating device, are held standby until the temperature of the supplied water reaches the saturated steam temperature in the low-temperature heating device (during A-A' in FIG. 6B). Consequently, heat cannot be collected in the high temperature heating device during A-A'.

Moreover, according to the above-described known technology, the amount of heat collected by the low temperature heating device and the amount of heat collected by the high temperature heating device are not balanced depending on the season. Thus, there is a need for the heliostats to be held standby to balance the amounts. This will be described below, using FIGS. 7A, 7B, 8A, and 8B.

FIGS. 7A and 7B illustrate the principles of heat collection by the low temperature heating device and the high temperature heating device. As illustrated in FIG. 7A, the low temperature heating device uses a method in which light reflected from a horizontally disposed mirror is focused on a horizontal heat transfer tube disposed above the mirror to heat a working medium in the heat transfer tube. For example, during the culmination of the sun in summer, the mirror disposed horizontal to the sun faces the sun more directly as the sun approaches to the zenith. This enables the light receptive area to be increased, that is, the heat collecting efficiency to be maximized. On the other hand, during the culmination of the sun in winter, for example, sunlight is obliquely incident on the mirror. This causes the light receptive area to be decreased, and thus the heat collecting efficiency declines.

FIG. 7B illustrates the principle of heat collection by the high temperature heating device. In this method, sunlight is reflected by a large number of biaxial tiltable mirrors called heliostats, and is focused on a heat transfer tube panel called receiver disposed at an upper portion of a tower to heat a working medium in the heat transfer tube panel. In the case of the high temperature heating device, as illustrated in FIG. 7B, some of the mirrors face the sun more directly as it gets closer to winter, and thus the heat collecting efficiencies of some of the heliostats are increased. However, considering the individually varying heat collecting efficiencies of all the hundreds to thousands of heliostats in total, the annual fluctuations in the heat collecting efficiencies tend to be small.

FIGS. 8A and 8B illustrate relationships between latitudes and the heat collecting efficiencies of the low temperature heating device and the high temperature heating device. FIG. 8A illustrates that the fluctuations in the heat collecting efficiencies of both the low temperature heating device and the high temperature heating device are small at a low latitude where the orbit of the sun during the day is close to the zenith throughout the year. In other words, even though the facility scales of the low temperature heating device and the high temperature heating device are determined with reference to a planned point, for example, the summer solstice, the fluctuations in the heat collecting efficiencies of the low temperature heating device and the high temperature heating device in winter are small, and thus the amounts of collected heat, which are in correlation with the heat collecting efficiencies, do not significantly decline.

However, the altitude of the sun decreases in winter at higher latitudes as illustrated in FIG. 8B, and the heat collecting efficiency of the low temperature heating device declines as illustrated in FIG. 7A. Consequently, in a case where the facility scales of the low temperature heating device and the high temperature heating device are determined with reference to the summer solstice, for example, the flow rate of saturated steam in winter declines. Thus, the amount of heat collected by the high temperature heating device, which can collect as much heat as at the summer solstice, needs to be suppressed, and the heliostats need to be held standby. As a result, the operating ratio of the facility declines in the known technology.

To solve this problem, saturated steam, which is running short, may be complementarily generated by superimposing sunlight collectible by a part of non-operating heliostats on the low-temperature heat collecting device. However, the inventors of the present application have found out through their research and development work that focusing sunlight collectible by the heliostats onto the existing low-temperature heat collecting device (linear light focusing heat collector) does not lead to efficient heat collection nor an increase in the amount of saturated steam.

This is because of differences in design of the heat collecting devices. That is, the trough type or Fresnel type low-temperature heat collecting device (linear light focusing heat collector) is originally designed to collect heat from light reflected from a reflective/focusing member (such as a mirror or a lens) disposed at a relatively close distance (focal distance) from a heat collecting tube and focused on the heat collecting tube. By contrast, the high-temperature heat collecting device is designed to receive light, reflected from the large number of heliostats disposed remote from the heat transfer tube panel (large focal distance), using the heat collecting surface of the heat transfer tube panel extending lengthwise and crosswise.

More specifically, one of the main factors preventing saturated steam from being efficiently generated even by focusing sunlight on the linear light focusing heat collector using the heliostats is that the focusing pattern of the light from the heliostats is difficult to match the shape of the light receptive surface of the linear light focusing heat collector.

The present invention has been made in consideration of the above-described circumstances. A first object of the present invention is to provide a solar heat collection system for reducing the time for the temperature of steam generated in a low temperature heating device to reach the saturated steam temperature. A second object of the present invention is to provide a solar heat collection system for rectifying imbalance in the amounts of heat collected by the low temperature heating device and a high temperature heating device depending on the season.

Means for Solving the Problem

To achieve the above-described objects, a solar heat collection system according to the present invention includes a solar heat collection system including: a low temperature heating device configured to heat supplied water by using heat of sunlight to generate steam; a steam separation device configured to separate two-phase water-steam fluid generated in the low temperature heating device into water and steam; and a high temperature heating device configured to heat the steam separated in the steam separation device by using heat of sunlight reflected by a plurality of heliostats to generate superheated steam. The low temperature heating device includes: a first heat collector including a first heat collecting tube that is linearly disposed and a first reflective member that is linearly disposed in a longitudinal direction of the first heat collecting tube, and configured to reflect the sunlight onto the first heat collecting tube, the first heat collector being configured to focus light reflected from the first reflective member onto the first heat collecting tube to heat water flowing in the first heat collecting tube, and a second heat collector including a second heat collecting tube that is linearly disposed, and configured to receive light reflected from at least a part of the plurality of heliostats to heat water flowing in the second heat collecting tube.

Moreover, to achieve the above-described objects, an operation method of a solar heat collection system according to the present invention is provided. The solar heat collection system includes a low temperature heating device configured to heat supplied water by using heat of sunlight to generate steam, a steam separation device configured to separate two-phase water-steam fluid generated in the low temperature heating device into water and steam, and a high temperature heating device configured to heat the steam separated in the steam separation device by using heat of sunlight reflected by a plurality of heliostats to generate superheated steam, the low temperature heating device including a first heat collector disposed downstream in a water flow and a second heat collector disposed upstream and being connected with the first heat collector in series with each other. The operation method includes: flowing water into the first heat collector through the second heat collector; reflecting sunlight onto the second heat collector by using at least a part of the plurality of heliostats for a predetermined period of time; and causing water to bypasses the second heat collector and to flow into the first heat collector after the predetermined period of time elapses.

Effect of Invention

According to the present invention, the time until the temperature of steam generated in the low temperature heating device reaches the saturated steam temperature can be reduced. Moreover, according to the present invention, the imbalance of the amounts of collected heat between the low temperature heating device and the high temperature heating device caused according to the season can be rectified. Objects, configurations, and effects other than the above descriptions will become apparent from the following descriptions of embodiments.

BRIEF DESCRIPTION OF THE DRAWINGS

FIGS. 6A to 6C illustrate a relationship between direct solar radiation under fine weather, the fluid temperature at the outlet of the low temperature heating device, and the steam flow rate at the outlet of the steam separation device according to the known technology.

FIGS. 7A and 7B illustrate principles of heat collection by the low temperature heating device and a high temperature heating device.

FIGS. 8A and 8B illustrate relationships between latitudes and the heat collecting efficiencies of the low temperature heating device and the high temperature heating device.

DESCRIPTION OF THE PREFERRED EMBODIMENTS

First Embodiment

Figure 1:
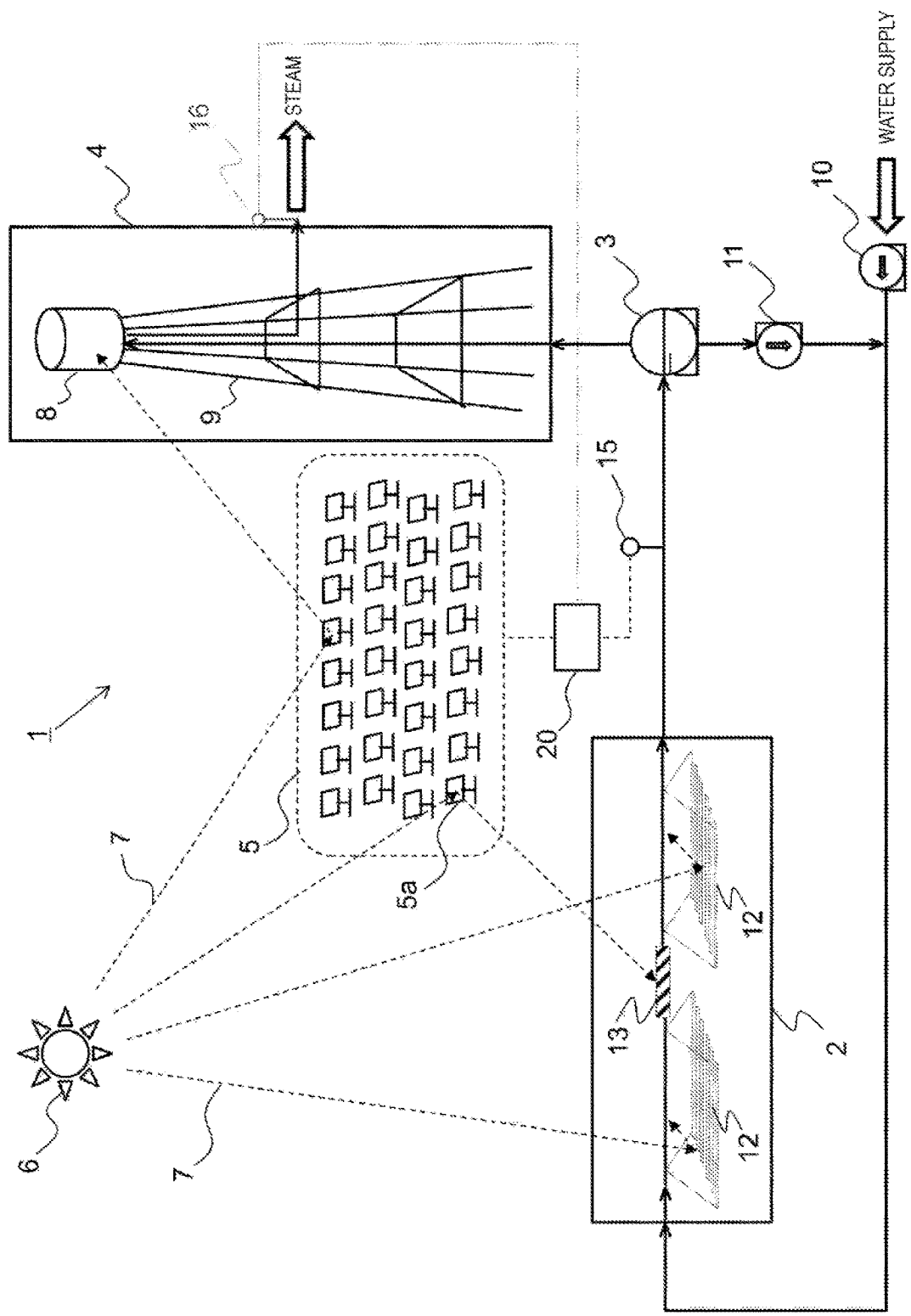
FIG. 1 is an entire configuration diagram of a solar heat collection system according to an embodiment of the present invention.

Embodiments of the present invention will be described below with reference to the drawings. FIG. 1 is an entire configuration diagram of a solar heat collection system according to embodiments of the present invention. This solar heat collection system 1 is used to supply superheated steam to a steam turbine of a solar thermal power plant. Although not illustrated, the solar thermal power plant includes the steam turbine driven by superheated steam generated in a high temperature heating device 4 of the solar heat collection system 1, a generator that generates electricity using motive power of the steam turbine, a condenser that condenses superheated steam supplied to the steam turbine into water, and a line for supplying water condensed by the condenser to a low temperature heating device 2 of the solar heat collection system 1.

In FIG. 1, reference sign 2 denotes the low temperature heating device that heats water using solar heat, reference sign 3 denotes a steam separation device that separates two-phase water-steam fluid into water and steam, reference sign 4 denotes the high temperature heating device that heats steam using solar heat, reference sign 5 denotes heliostats, reference sign 6 denotes the sun, reference sign 7 denotes sunlight, reference sign 10 denotes a water supply pump, reference sign 11 denotes a circulating pump, reference sign 15 denotes a temperature detector, and reference sign 20 denotes a control device (heliostat control device).

In the description below, piping that connects components is expressed as line ◯-◯. The "◯" represents a reference sign, and, for example, a line 2-3 represents piping that connects the low temperature heating device 2 and the steam separation device 3.

As illustrated in FIG. 1, in the solar heat collection system 1, water supplied from the water supply pump 10 is sent to the low temperature heating device 2 through a line 10-2. In the low temperature heating device 2, water is heated using heat of the sunlight 7 to generate two-phase water-steam fluid. The generated two-phase water-steam fluid is sent to the steam separation device 3 through the line 2-3.

The two-phase water-steam fluid introduced into the steam separation device 3 is separated into water and steam in the steam separation device 3. The separated saturated steam is sent to the high temperature heating device 4 through a line 3-4. The saturated steam introduced into the high temperature heating device 4 is further heated in the high temperature heating device 4 using heat of the sunlight 7 reflected by the heliostats 5 to generate superheated steam. The water separated in the steam separation device 3 is sent to the circulating pump 11 through a line 3-11. The water pressurized in the circulating pump 11 is sent to an inlet of the low temperature heating device 2 through a line 11-2.

Next, the high temperature heating device 4 will be described in detail. The high temperature heating device 4 is a so-called tower type light focusing and heat collector device, and more specifically, includes a tower 9 having a predetermined height (approximately 30 m to 100 m) and a heat transfer tube panel 8 mounted on top of the tower 9. On the other hand, the large number of heliostats oriented in various directions are disposed on the ground surface, and a group of heliostats focus sunlight onto the high temperature heating device 4 (heat transfer tube panel 8) while following the movement of the sun 6 to generate superheated steam. The angle of each of the heliostats 5 is controlled by the control device 20. In addition, as described later, angles of a part of the group of heliostats 5 (reference sign 5a) are controlled by the control device 20 such that the heliostats 5a can reflect sunlight onto the low temperature heating device 2.

Next, the low temperature heating device 2 will be described in detail. The low temperature heating device 2 is a so-called Fresnel type light focusing and heat collector device, and more specifically, includes a large number of flat or slightly curved light focusing mirrors 12, of which angles are slightly different from each other, and a group of heat transfer tubes 13 horizontally disposed in a plane a few meters above such a group of light focusing mirrors 12. The sunlight 7 is focused by the group of light focusing mirrors 12 for the group of heat transfer tubes 13 to heat the water passing through each of the heat transfer tubes 13 and thus to generate two-phase water-steam fluid.

In some embodiments, a trough type light focusing and heat collector device, including light focusing mirrors extending in a trough shape and heat transfer tubes disposed above the inner circumferences of curved surfaces of the light focusing mirrors and focusing sunlight onto the heat transfer tubes using the light focusing mirrors to heat water passing through the heat transfer tubes and thus to generate steam, may be used instead of the low temperature heating device 2 including the Fresnel type light focusing and heat collector device.

Next, control of the group of heliostats 5 by the control device 20 will be described. The control device 20 receives data from the temperature detector 15 that detects the steam temperature at an outlet of the low temperature heating device 2. For example, during a period (predetermined period) after the solar heat collection system 1 starts operating until the steam temperature detected at the temperature detector 15 reaches the saturated steam temperature, the control device 20 controls the angles of the heliostats 5a disposed closer to the low temperature heating device 2 among the group of heliostats 5 such that the heliostats 5a face the heat transfer tubes 13 of the low temperature heating device 2. This causes the heliostats 5a to reflect and focus the sunlight 7 onto the heat transfer tubes 13, resulting in a reduction in time of saturated steam generation by the low temperature heating device 2. When the steam temperature detected at the temperature detector 15 reaches the saturated steam temperature, the control device 20 controls the angles of the heliostats 5a directed to the low temperature heating device 2 such that the heliostats 5a face the high temperature heating device 4 (return to the original positions).

Note that the angles of the heliostats 5a disposed closer to the low temperature heating device 2 among the group of heliostats 5 are controlled since the efficiency of focusing light onto the heat transfer tubes 13 of the low temperature heating device 2 is higher than the case where the angles of the heliostats remote from the low temperature heating device 2 are controlled.

In this manner, saturated steam is not supplied to the high temperature heating device 4 until saturated steam is generated in the low temperature heating device 2, and the high temperature heating device 4 is held standby. Thus, all the group of heliostats 5 may not be necessarily used to focus the sunlight 7 onto the heat transfer tube panel 8 of the high temperature heating device 4. In this embodiment, a part of the heliostats 5a, excluding the heliostats 5 required for preheating of the high temperature heating device 4, are used to focus the sunlight 7 onto the low temperature heating device 2 to reduce the time for saturated steam generation by the low temperature heating device 2.

The control device 20 receives data from a temperature detector 16 that detects the steam temperature at an outlet of the high temperature heating device 4. For example, after the solar heat collection system 1 starts operating and the steam temperature detected at the temperature detector 16 reaches a predetermined temperature (for example, 550° C.), the predetermined temperature can be maintained without directing all the heliostats 5 to the high temperature heating device 4 in a case where the flow rate of saturated steam from the low temperature heating device 2 does not reach the rated flow, depending on the number of heliostats 5 or solar radiation conditions.

Accordingly, the angles of, for example, the heliostats 5a that are held standby and do not face the high temperature heating device 4 among the group of heliostats 5 are controlled such that the heliostats 5a face the heat transfer tubes 13 of the low temperature heating device 2. This causes the heliostats 5a to reflect and focus the sunlight 7 onto the heat transfer tubes 13, resulting in an increase in the flow rate of saturated steam generated in the low temperature heating device 2.

When the steam temperature detected at the temperature detector 16 falls below a predetermined temperature (for example, 550° C.), the control device 20 controls the angles of the heliostats 5a directed to the low temperature heating device 2 such that the heliostats 5a face the high temperature heating device 4.

Thus, in this embodiment, excluding the heliostats 5a for maintaining the steam temperature at the outlet of the high temperature heating device 4, a part of the heliostats 5 are used to focus the sunlight 7 onto the low temperature heating device 2 to increase the flow rate of saturated steam from the low temperature heating device 2.

Figure 2A:
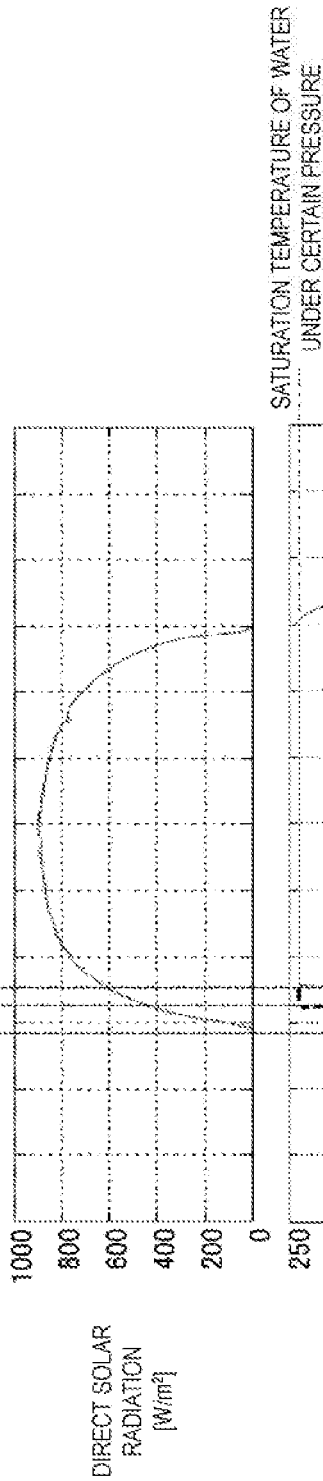
FIGS. 2A to 2C illustrate direct solar radiation under fine weather, fluid temperatures at an outlet of a low temperature heating device, and steam flow rates at an outlet of a steam separation device, respectively, for comparison between the present invention and a known technology.
Figure 2B:
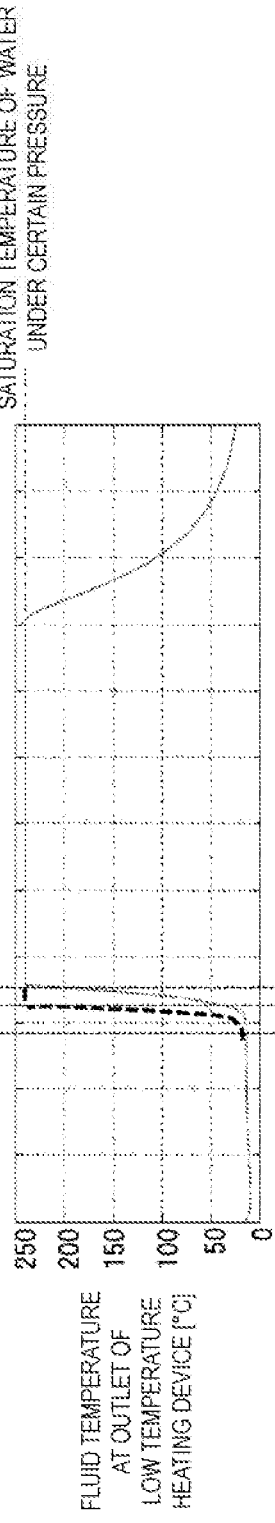
Figure 2C:
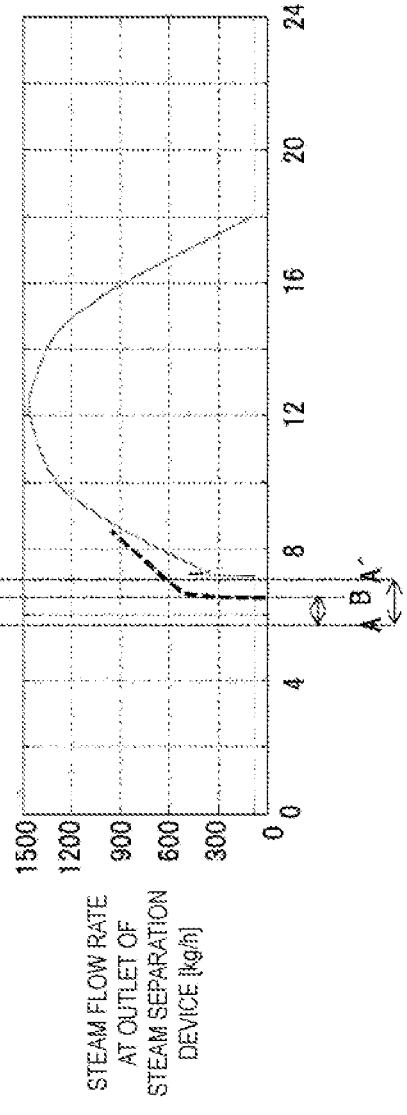
Figure 3:
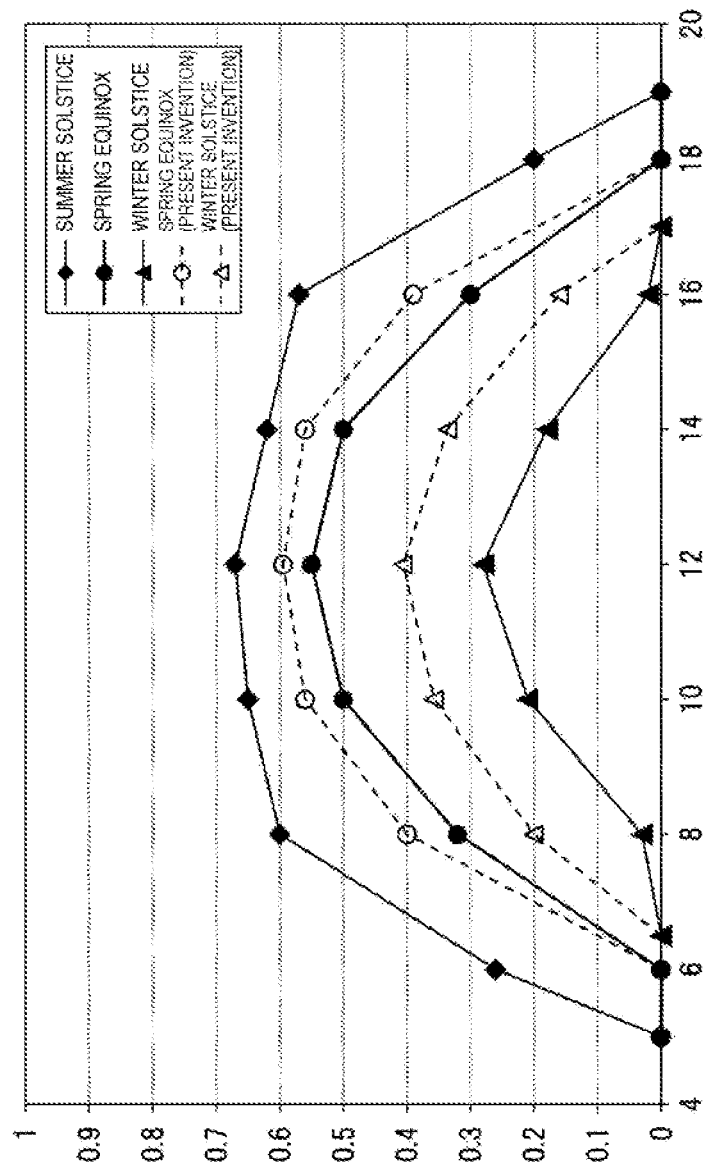
FIG. 3 illustrates the heat collecting efficiency of the low temperature heating device.
Figure 4A:
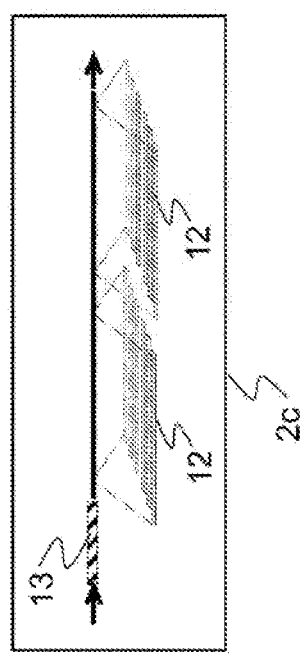
FIGS. 4A to 4D illustrate modifications of the low-temperature heat collecting device applicable to the present invention.
Figure 4B:
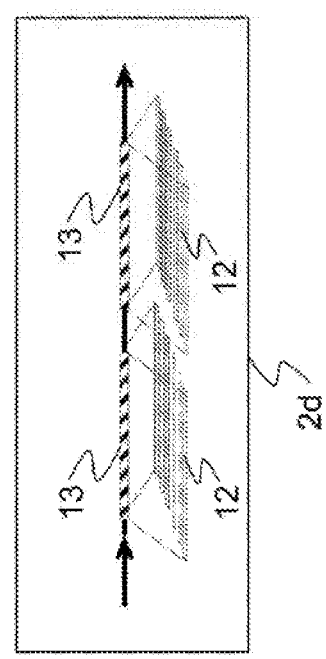
Figure 4C:
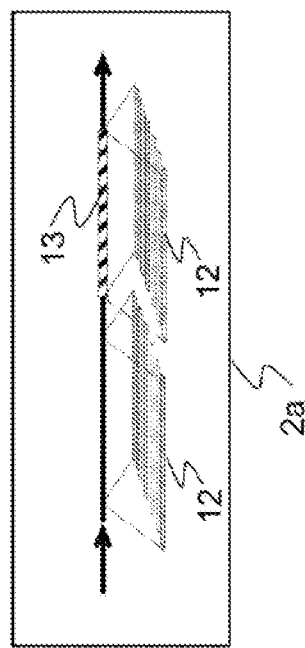
Figure 4D:
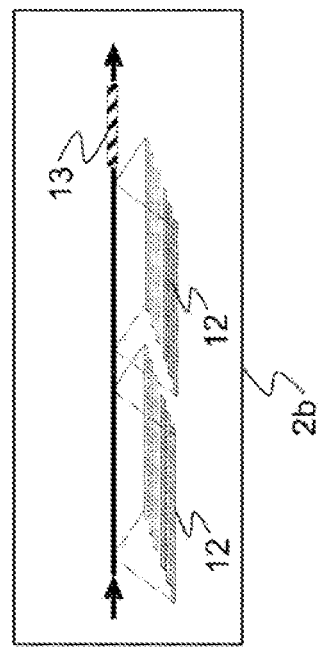

Next, advantageous effects of the present invention will be described by comparing with a known technology. FIGS. 2A to 2C illustrate direct solar radiation under fine weather, fluid temperatures at the outlet of the low temperature heating device, and steam flow rates at an outlet of the steam separation device, respectively, for comparison between the present invention and the known technology. FIG. 3 illustrates the heat collecting efficiency of the low temperature heating device.

As illustrated in FIG. 2B, the time required for the fluid temperature at the outlet of the low temperature heating device 2 to reach the saturated steam temperature is reduced from A-A' to A-B due to the heat collection using the heliostats 5a. Although conditions vary depending on the number of heliostats 5a to be used, the scale of power generation, or other factors, the utilization ratio of the heliostats increases by 5% to 8% points by designing the system to reduce the time required for saturated steam generation by 20 to 30 minutes in a case where there are 8 hours of sunlight per day.

FIG. 3 illustrates the heat collecting efficiency of the low temperature heating device 2 according to the present invention. The facility scales of the low temperature heating device 2 and the high temperature heating device 4 are determined with reference to, for example, the summer solstice, and the heliostats 5a held standby are divided into a group for heating the low temperature heating device 2 and a group for heating the high temperature heating device 4 in accordance with the flow rate of saturated steam increased by heating the low temperature heating device 2. This leads to an increase in the heat collecting efficiency of the low temperature heating device 2 by about 1.05 to 1.10 times at the spring equinox and by about 1.40 to 1.45 times in winter. In other words, according to the present invention, utilization of the heliostats 5a held standby enables efficient heat collection even in a case where the system is installed at high latitudes.

Next, various modifications of the low temperature heating device applicable to the present invention will be described with reference to the drawings. FIGS. 4A to 4D and FIGS. 5A to 5E illustrate modifications of the low-temperature heat collecting device applicable to the present invention. A low temperature heating device 2a illustrated in FIG. 4A has a configuration in which light reflected by the heliostats 5a is focused onto a heat transfer tube 13 identical to a horizontally disposed heat transfer tube. As long as the horizontally disposed heat transfer tube can collect the light reflected by the heliostats 5a in this manner, no additional heat transfer tube is provided. A low temperature heating device 2b illustrated in FIG. 4B includes a heat transfer tube 13 disposed downstream of a horizontally disposed heat transfer tube and capable of collecting light reflected by the heliostats 5a. A low temperature heating device 2c illustrated in FIG. 4C includes a heat transfer tube disposed upstream of a horizontally disposed heat transfer tube and capable of collecting light reflected by the heliostats 5a. As can be seen from FIGS. 4A to 4C, light reflected by the heliostats 5a may be focused onto any spot in the low temperature heating device 2 as long as the working medium passes through the spot. Additionally, as in a low temperature heating device 2d illustrated in FIG. 4D, two or more heat transfer tubes 13 serve as objects that collect light reflected from the heliostats 5a, in some cases.

Furthermore, as illustrated in FIGS. 5A to 5E, the heat transfer tube of the low temperature heating device may have a configuration similar to the configuration of, for example, the heat transfer tube panel for the high temperature heating device 4. A low temperature heating device 2e illustrated in FIG. 5A includes a heat transfer tube panel 25 between two horizontally disposed heat transfer tubes, and light reflected by the heliostats 5a is focused onto the heat transfer tube panel 25. A low temperature heating device 2f illustrated in FIG. 5B includes a heat transfer tube panel 25 downstream of a horizontally disposed heat transfer tube, and light reflected by the heliostats 5a is focused onto the heat transfer tube panel 25. A low temperature heating device 2g illustrated in FIG. 5C includes a heat transfer tube panel 25 upstream of a horizontally disposed heat transfer tube by contrast to the case of the low temperature heating device 2f.

Figure 5A:
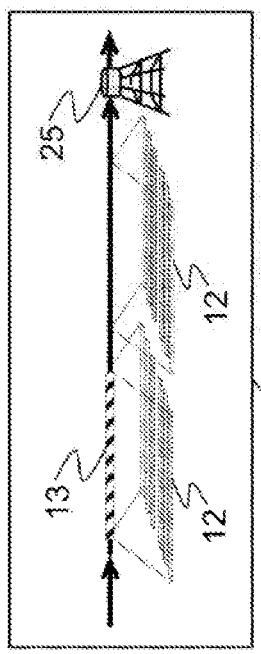
FIGS. 5A to 5E illustrate modifications of the low-temperature heat collecting device applicable to the present invention.
Figure 5D:
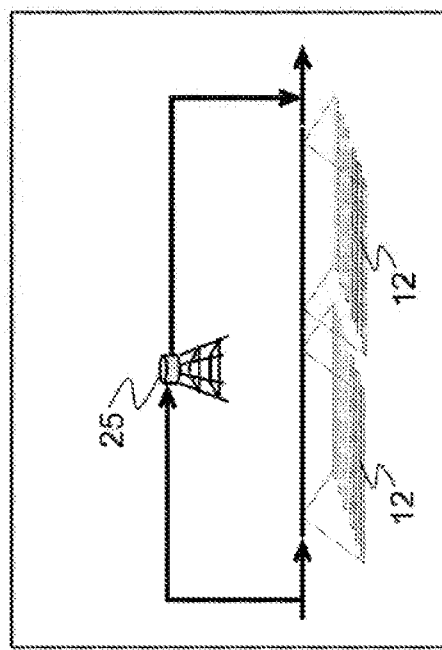
Figure 5B:
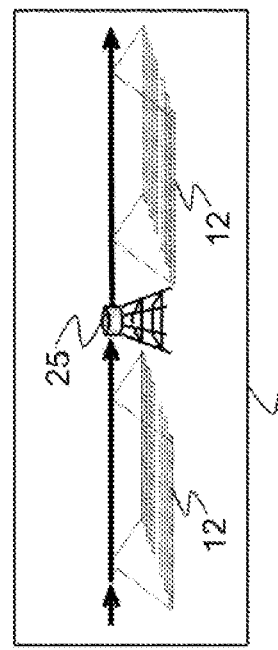
Figure 5C:
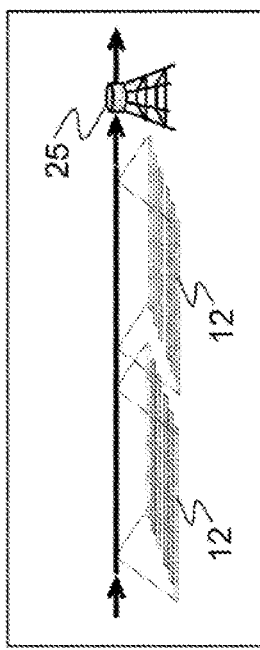
Figure 5E:
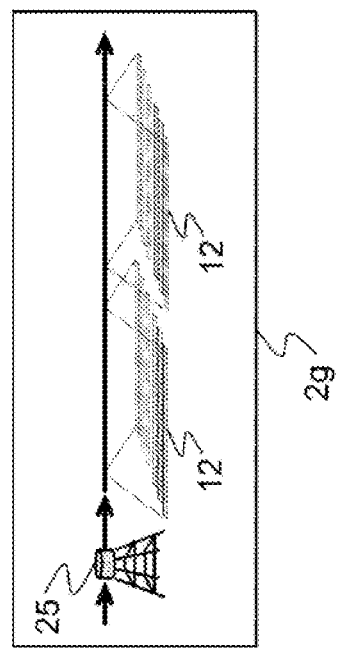

A low temperature heating device 2h illustrated in FIG. 5D includes a heat transfer tube 13 and a heat transfer tube panel 25 in series, and light reflected from the heliostats 5a is focused onto the heat transfer tube 13 and the heat transfer tube panel 25. FIG. 5E illustrates a configuration in which light reflected from the heliostats 5a is focused onto a heat transfer tube panel 25 connected in parallel with a horizontally disposed heat transfer tube. Various low temperature heating devices described above may be adopted as appropriate.

Second Embodiment

Figure 9:
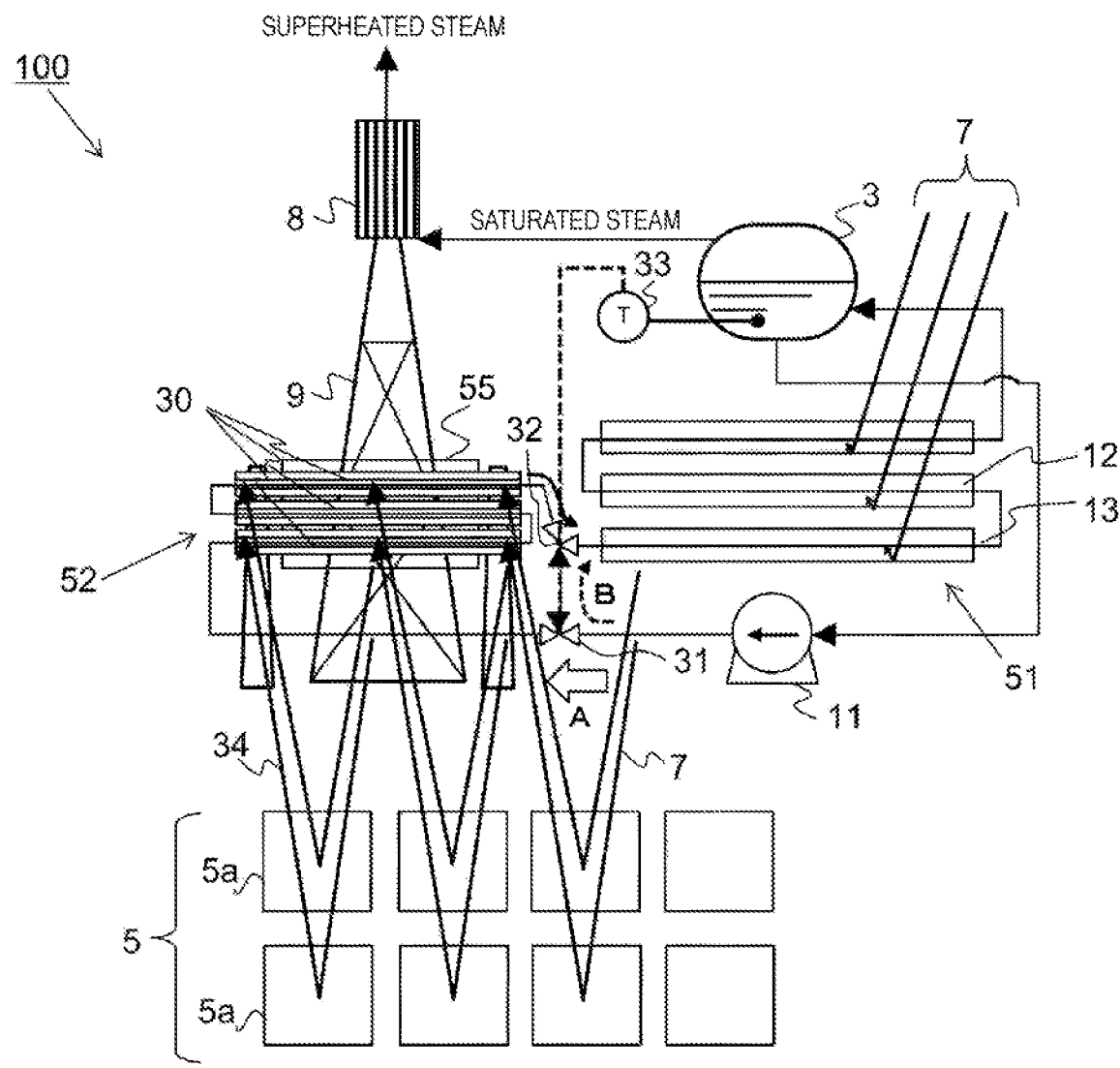
FIG. 9 is an entire configuration diagram of a solar heat collection system according to a second embodiment of the present invention.

Next, a second embodiment of the present invention will be described. FIG. 9 is a schematic configuration diagram of a solar heat collection system according to the second embodiment of the present invention. The same components as those in the first embodiment will be denoted by the same reference signs, and detailed descriptions thereof will be omitted. As illustrated in FIG. 9, a solar heat collection system 100 according to the second embodiment includes a saturated steam generation system in which light focusing mirrors 12 receive sunlight 7, the light focusing mirrors 12 reflect and focus the light onto heat collecting tubes 13, and water in the heat collecting tubes 13 is circulated by a circulating pump 11 to increase the temperature of water in a steam drum (steam separation device) 3; and a superheated steam generation system in which saturated steam generated in the steam drum 3 is led to a superheater (heat transfer tube panel) 8 of a tower 9, and then the superheater 8 is irradiated with the sunlight 7 received and reflected by heliostats 5 to generate superheated steam.

In this embodiment, the saturated steam generation system includes a first linear light focusing heat collector (first heat collector) 51 and a second linear light focusing heat collector (second heat collector) 52 as a low temperature heating device.

The first linear light focusing heat collector 51 includes the multiple linearly disposed double vacuum-tube type heat collecting tubes (first heat collecting tube) 13 and the multiple light focusing mirrors (first reflective member) 12 disposed linearly in the longitudinal direction of the respective double vacuum tube type heat collecting tubes 13 (hereinafter referred to as heat collecting tubes 13) and reflecting sunlight onto the heat collecting tubes 13, and is configured to heat water flowing in each of the heat collecting tubes 13 by focusing light reflected from each of the light focusing mirrors 12 onto each of the heat collecting tubes 13. The multiple heat collecting tubes 13 are disposed in a plane a few meters above the group of light focusing mirrors 12. The number of heat collecting tubes 13 and the number of light focusing mirrors 12 may be determined as appropriate according to the specifications.

The second linear light focusing heat collector 52 includes multiple double vacuum tube type heat collecting tubes (second heat collecting tube) 30. The multiple double vacuum tube type heat collecting tubes 30 (hereinafter, referred to as heat collecting tubes 30) are vertically disposed in a plane (panel shape) while each of the heat collecting tubes 30 is horizontally disposed. The heat collecting tubes 30 are connected in series, the multiple heat collecting tubes 30 disposed in a plane receive light reflected from heliostats 5a held standby, and then water flowing in the heat collecting tubes 30 is heated. Herein, the number of heat collecting tubes 30 may be determined as appropriate according to the specifications. Double vacuum tube type of heat collecting tubes having a tube outer diameter of 70 mm and a glass tube outer diameter of 125 mm, for example, are applicable to the heat collecting tubes 13 and the heat collecting tubes 30.

The second linear light focusing heat collector 52 is installed in a space between the tower 9 and the heliostats 5. In this embodiment, the second linear light focusing heat collector 52 is mounted on a support structure of the tower 9 with consideration of the focal distance from the heliostats 5. However, the second linear light focusing heat collector 52 may be mounted on an additional support structure disposed in the space between the tower 9 and the heliostats 5.

Additionally, in this embodiment, an auxiliary mirror (second reflective member) 55 is disposed on the rear side of the heat collecting tubes 30 (opposite the side on which the heliostats 5 are arranged) to increase the light focusing efficiency by secondarily reflecting the reflected light escaping through gaps between the heat collecting tubes 30. However, the auxiliary mirror may not be necessarily included.

The first linear light focusing heat collector 51 and the second linear light focusing heat collector 52 are connected in series via two three-way valves 31 and 32 serving as flow channel switching mechanisms. The second linear light focusing heat collector 52 is disposed upstream in a water flow, and the first linear light focusing heat collector 51 is disposed downstream. More specifically, an inlet of the heat collecting tubes 30 is connected with an outlet of a circulating pump 11 via the three-way valve 31. Moreover, an outlet of the heat collecting tubes 30 is connected with an inlet of the heat collecting tubes 13 via the three-way valve 32. Furthermore, the three-way valve 31 and the three-way valve 32 are connected with each other via the ends of the remaining ports using piping. Additionally, a steam drum water thermometer 33 that measures the water temperature inside the steam drum 3 is disposed in the steam drum 3, and open and close signals based on the gauge reading of the steam drum water thermometer 33 are input to the two three-way valves 31 and 32.

Operations of the solar heat collection system according to the second embodiment configured as above will now be described. When the solar heat collection system starts after sunrise, the saturated steam generation system starts first. Until the gage reading of the steam drum water thermometer 33 reaches a target temperature (for example, 300° C.), the three-way valve 31 is open in a direction that allows water serving as in-tube fluid to flow in a direction of an arrow A in FIG. 9 from the outlet of the circulating pump 11 toward the inlet of the heat collecting tubes 30, and the three-way valve 32 is open in a direction that allows water serving as the in-tube fluid to flow from the outlet of the heat collecting tubes 30 toward the inlet of the heat collecting tubes 13. Consequently, there is no flow of fluid between the three-way valves 31 and 32 (first flow channel).

When the circulating pump 11 is driven in this state, water sent out from the circulating pump 11 sequentially flows into the three-way valve 31, the heat collecting tubes 30, the three-way valve 32, the heat collecting tubes 13, and the steam drum 3, and then returns to the circulating pump 11. At this moment, the heat collecting tubes 30 are irradiated with reflected light 34 from the heliostats 5a on standby to increase the temperature of water inside the heat collecting tubes 30. The hot water is led to the heat collecting tubes 13, and the temperature of the hot water is further increased by light reflected from the light focusing mirrors 12 irradiated with the sunlight 7.

After the gauge reading of the steam drum water thermometer 33 reaches the target temperature, saturated steam inside the steam drum 3 is ready to be supplied to the superheater 8. At the stage where the superheater 8 is irradiated with light reflected by the heliostats 5, the irradiation by the heliostats 5a held standby is switched from the heat collecting tubes 30 to the superheater 8 to generate superheated steam. Subsequently, the three-way valves 31 and 32 are switched to separate the fluid in the heat collecting tubes 13 and the fluid in the heat collecting tubes 30. In other words, the hot water sent out from the circulating pump 11 directly flows into the heat collecting tubes 13 in a direction of an arrow B in FIG. 9 through the piping connecting the three-way valve 31 and the downstream three-way valve 32 without passing through the heat collecting tubes 30.

As described above, according to the second embodiment, the amount of heat collected by the entire low temperature heating device (linear light focusing heat collector) at startup of the solar heat collection system is increased, and thus saturated steam can be generated in the steam drum 3 faster than was previously possible. This results in a reduction in startup time.

Moreover, the multiple heat collecting tubes 30 are disposed in an orthogonal plane between the tower 9 and the heliostats 5, and thus the heat collecting tubes 30 can be efficiently irradiated with light reflected from the heliostats 5a held standby, and in addition, the entire heat collecting tubes 30 can be efficiently irradiated with light reflected from the heliostats 5a held standby. This facilitates formation of a uniform heating state and control of local increases in temperature such as hot spots.

As described above, in accordance with the solar heat collection system 1 according to embodiments of the present invention, water supplied to the low temperature heating device 2 can be heated using light reflected from the light focusing mirrors 12 of the low temperature heating device 2 and light reflected from the heliostats 5a held standby. This leads to a reduction in time required to generate saturated steam in the low temperature heating device 2. The operating ratio of the solar heat collection system 1 is thus improved. Moreover, even at high latitudes, utilization of the heliostats 5a held standby rectifies the imbalance of the amounts of collected heat between the low temperature heating device 2 and the high temperature heating device 4 caused according to the seasons, and thus prevents a reduction in light focusing efficiency.

The present invention is not limited to the above-described embodiments, and includes various modifications. For example, the details of the above-described embodiments are for the purpose of intelligibly describing the present invention, and are not intended to limit the invention to those with all the configurations described above.

For example, the three-way valves 31 and 32 are described only as an example combination of the flow channel switching mechanisms. Alternatively, for example, multiple flow rate adjustment valves may be disposed on a flow channel passing through the heat collecting tubes 30 and on a flow channel bypassing the heat collecting tubes 30.

In this case, the flow rate of fluid (water) to be heated flowing in the heat collecting tubes 30 can be adjusted while the whole amount of fluid to be heated is flowing in the heat collecting tubes 13 by controlling the opening of each of the flow rate adjustment valves. This enables adjustment of operation in which, for example, the whole amount of fluid to be heated flows into the heat collecting tubes 13 and the heat collecting tubes 30 immediately after the solar heat collection system 100 starts up, and in which the flow rate of the fluid to be heated flowing in the heat collecting tubes 30 is gradually reduced with the passage of time after startup.

REFERENCE NUMERALS

1 Solar heat collection system
2 Low temperature heating device
3 Steam separation device/steam drum
4 High temperature heating device
5 Heliostat
5a Heliostat on standby
6 Sun
7 Sunlight
8 Heat transfer tube panel/superheater
26
9 Tower
10 Water supply pump
11 Circulating pump
12 Light focusing mirror
13 Heat transfer tube/heat collecting tube
15 Temperature detector
20 Control device (heliostat control device)
30 Double vacuum tube type heat collecting tube (second heat collecting tube)
31, 32 Three-way valve (flow channel switching mechanism)
55 Auxiliary mirror (second reflective member)

The invention claimed is:
1. A solar heat collection system comprising:
a low temperature heating device configured to heat supplied water by using heat of sunlight to generate steam;
a steam separation device configured to separate two-phase water-steam fluid generated in the low temperature heating device into water and steam; and
a high temperature heating device configured to heat the steam separated in the steam separation device by using heat of sunlight reflected by a plurality of heliostats to generate superheated steam, wherein
the low temperature heating device includes:
a first heat collector including a plurality of first heat collecting tubes that are linearly disposed and a plurality of first reflective members that are linearly disposed in a longitudinal direction of the plurality of first heat collecting and configured to reflect the sunlight onto the plurality of first heat collecting tubes, the first heat collector being configured to focus light reflected from the plurality of first reflective members onto the plurality of first heat collecting tubes to heat water flowing in the plurality of first heat collecting tubes; and
a second heat collector including a plurality of second heat collecting tubes that are linearly disposed in a plane, and configured to focus light reflected from at least a part of the plurality of heliostats to heat water flowing in the plurality of second heat collecting tubes,
the first heat collector is disposed downstream in a water flow, the second heat collector is disposed upstream, and the first heat collector and the second heat collector are connected in series with each other, and
the low temperature heating device further includes a flow channel switching mechanism configured to switch a flow channel of water between a first flow channel along which the water flows into the first heat collector through the second heat collector and a second flow channel along which the water bypasses the second heat collector and flows into the first heat collector.

2. The solar heat collection system according to claim 1 further comprising:
a heliostat control device configured to control angles of the plurality of heliostats, wherein
the heliostat control device controls the angle of each of the plurality of heliostats such that the sunlight is reflected onto the high temperature heating device and such that the sunlight is reflected onto the second heat collector for a predetermined period of time.

3. The solar heat collection system according to claim 2, wherein
the flow channel switching mechanism switches the flow channel to the first flow channel for the predetermined period of time, and switches the flow channel from the first flow channel to the second flow channel after the predetermined period of time elapses.

4. The solar heat collection system according to claim 3, wherein
the predetermined period of time is a period of time until the water supplied to the low temperature heating device reaches a saturated steam temperature.

5. An operation method of a solar heat collection system, the solar heat collection system including a low temperature heating device configured to heat supplied water by using heat of sunlight to generate steam, a steam separation device configured to separate two-phase water-steam fluid generated in the low temperature heating device into water and steam, and a high temperature heating device configured to heat the steam separated in the steam separation device by using heat of sunlight reflected by a plurality of heliostats to generate superheated steam, the low temperature heating device including a first heat collector disposed downstream in a water flow and a second heat collector disposed upstream and being connected with the first heat collector in series with each other,
the first heat collector including a plurality of first heat collectin tubes that are linearly disposed and a plurality of first reflective members that are linearly disposed in a longitudinal direction of the plurality of first heat collecting tubes and configured to reflect the sunlight onto the plurality of first heat collecting tubes, the first heat collector being configured to focus light reflected from the plurality of first reflective members onto the plurality of first heat collecting tubes to heat water flowing in the plurality of first heat collecting tubes; and
a second heat collector including a plurality of second heat collecting tubes that are linearly disposed in a plane, and configured to focus light reflected from at least a part of the plurality of heliostats to heat water flowing in the plurality of second heat collecting tubes,
the operation method comprising:
flowing water into the first heat collector through the second heat collector;
reflecting sunlight onto the second heat collector by using at least a part of the plurality of heliostats for a predetermined period of time; and
causing water to bypass the second heat collector and to flow into the first heat collector after the predetermined period of time elapses.

* * * * *